Nov. 9, 1926.
D. HEAD
BATTERY FILLING DEVICE
Filed Feb. 18, 1926
1,606,028
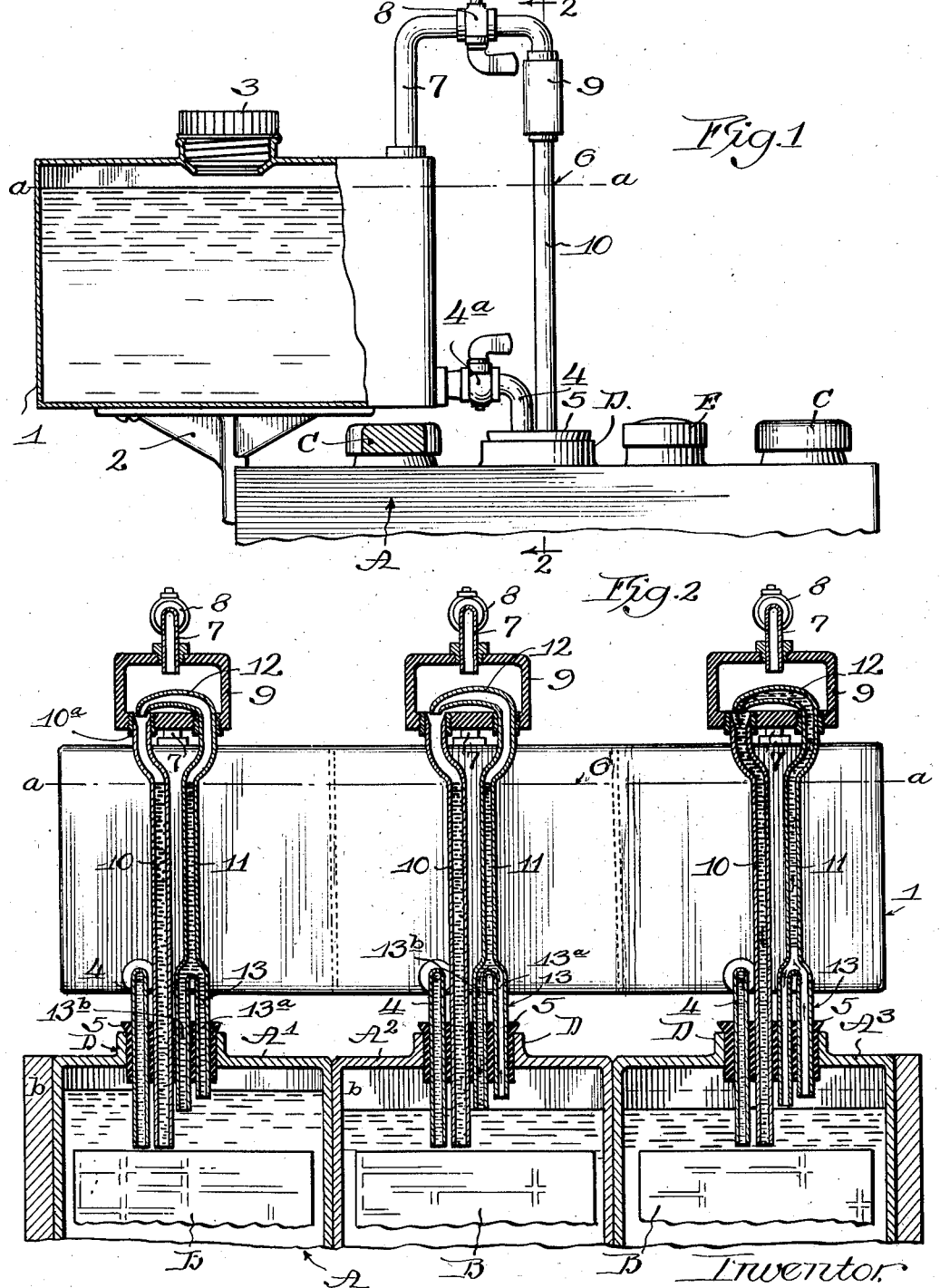
Witness:
Chas. L. Toursh.
Inventor
Drew Head,
Attys.

Patented Nov. 9, 1926.

1,606,028

UNITED STATES PATENT OFFICE.

DREW HEAD, OF CHICAGO, ILLINOIS.

BATTERY-FILLING DEVICE.

Application filed February 18, 1926. Serial No. 89,006.

This invention relates to battery filling devices, and more particularly to apparatus to be used in conjunction with storage batteries of all kinds, for the purpose of maintaining a constant level of the electrolyte in the cells, by replenishing the water lost through evaporation, from a source of supply and by means functioning automatically when the electrolyte is reduced to a predetermined level.

The object of the invention is to provide a practical and dependable device which will obviate frequent refilling of batteries by hand, as well as to protect the batteries against deterioration due to neglect.

A further object of the invention is to provide a filling device that is simple in construction, and certain in operation. I am aware that efforts have heretofore been made to devise apparatus for this purpose, but so far as I have knowledge, they have been open to objections, which render them unsuitable for practical use. I am further aware that battery fillers have been devised which depend on the uncovering of a vent pipe to promote the flow of water from a supply tank into the battery, a principle which I employ but in such a way as to overcome a common and vital defect, which is ordinarily overlooked, namely, the heretofore unavoidable escape of a quantity of the electrolyte into the supply tank through the vent pipe. A further defect in devices which operate on this principle is the uncertainty of action that is, the failure of the water to flow even when the end of the vent pipe has been uncovered.

These features will be discussed more at length in connection with the disclosure to follow:

In the accompanying drawings,

Figure 1 is a view in elevation of a standard form of storage battery equipped with the filling device; and Figure 2 is a view in vertical section taken on line 2—2 of Figure 1.

As shown in the drawing, the device is used in conjunction with an ordinary storage battery A of standard design consisting of three cells $A^1$, $A^2$, $A^3$, each with its complement of positive and negative plates B connected in series of bus-bars C, C and terminal poles, not shown. At the top of each cell is a filling opening D through which the pipes from the filling device extend, and in addition thereto, a separate opening normally closed with a screw cap E, which may be used for testing purposes without disturbing the connections from the supply tank 1, mounted on the battery and above the top thereof by a suitable bracket 2.

As clearly shown in Figure 2, the supply tank 1 is divided into three sections or compartments, each having a separate filling opening and screw cap 3, and separate pipes leading to and from each cell of the battery. The reason for this is obvious, namely, that the rate of evaporation in the different battery cells is not uniform, and hence the refilling of the cells varies in both quantity and intervals between filling operations.

Thus each cell and its respective supply compartment and piping is a separate and independent unit, and therefore for the purpose of description, only a single unit need be considered, although for convenience, different stages in the operation have been illustrated by the different cells.

From each of the separate compartments of the supply tank 1, extends a supply pipe 4, leading from the bottom thereof, outwardly and then downwardly through a plug or stopper 5 fitting into the opening D in the top of each cell. The lower end of the supply pipe 4 terminates just above the plates B and below the normal level of the electrolyte in the cell. In the supply pipe is a shut-off cock $4^a$, which normally is open, but may be closed while installing the device or making repairs.

Communicating with the top of each compartment of the supply tank 1, is a venting apparatus 6, consisting of an arrangement of pipes or tubes, as follows: Leading directly from the top of the tank is an inverted U-tube 7 having a stop cock 8 in its horizontal branch. The discharge branch of this U-tube is relatively short and opens downwardly into an air dome 9 positioned above the high water level in the supply tank. This dome 9 forms a relatively large chamber from which depends two tubes 10 and 11, extending through the stopper 5 and into the battery cell.

The tubes or pipes 4, 10 and 11 extending into the battery cells, are preferably of hard rubber or like material, as is the dome 9, although the pipe 7 may be of metal, if desired, since it does not come in contact with the electrolyte.

The tubes 10 and 11, differ somewhat in size and construction, the former (on the left in Figure 2) being slightly larger in diameter and is of a length to extend well below the level of the electrolyte in the battery cell, and at the same depth as the supply pipe 4. Its upper end is fitted into the bottom wall of the dome 9, preferably by means of a threaded collar $10^a$ having a taper fit on the end of the tube. The upper end of the tube 11 (on the right) is fitted into the dome 9 in the same manner, that is by a threaded collar $11^a$, but differs from the tube 10 in that it has an extension 12 within the dome, bent so that it extends horizontally of the space therein and thence terminating in a down-turned end opening into the upper end of the tube 10, which is slightly enlarged so that liquid can be discharged from one to the other without obstructing the scope of air.

The tubes 10 and 11 are bent just below the dome 9 to bring them into closer proximity, so that all of the tubes may pass through the stopper 5 in a cluster.

The lower end portion of the tube 11 is constructed in the form of an inverted U-tube 13, having two branches $13^a$ and $13^b$ which pass through the stopper 5 and into the cell. As shown in Figure 2, the right-hand branch $13^a$ of the U-tube 13 extends just beyond the stopper, and determines the high water level of the electrolyte. The other or left-hand branch $13^b$ is slightly longer and extends perhaps ⅛ of an inch below its companion branch $13^a$.

The operation of the filling device will be understood from the following: It may be assumed that the supply tank is filled with pure water to the level indicated by the line $a$—$a$, and the several caps 3 are screwed down so that the filling openings are air tight. In the battery, the prescribed level of the electrolyte is represented as $b$—$b$ (Figure 2) as shown in the cell $A^1$ on the left. In the remaining cells the level is shown below the normal level, this for the purpose of more clearly illustrating the action, wherein the three cells represent a single cell at three stages of the filling operation.

Following this procedure, the cell $A^1$ is filled to its proper level $b$—$b$, and the lower ends of all tubes immersed. Under these conditions the device is inoperative with the electrolyte standing in the tubes 10 and 11, up to the level $a$—$a$ of the water in the tank. As evaporation takes place, the level of the electrolyte gradually drops, first uncovering the end of the shorter branch $13^a$ of the inverted U-tube 13. Owing to the size of the tube and the head or column of liquid in the tube, the uncovering of this branch does not start the action of the device. However, when the level is further lowered to uncover the end of the longer branch $13^b$, as shown in cell $a^2$, the following action takes place: The head of the column of liquid in the branch $13^b$ being greater than that in branch $13^a$, this slight difference is sufficient to set up a flow of liquid upwardly in the shorter branch $13^a$ and downwardly in the longer branch $13^b$, as indicated by the arrows, (cell $A^2$) thus draining both branches and reducing the static head of the column of liquid remaining in the tube 11 above to such an extent as to give way to the atmospheric pressure, with the result that the air passes upwardly in the tube carrying the liquid with it, thus breaking the air seal and venting the supply tank, whereupon the water begins to flow into the cell through the supply pipe 4. At the initial breaking of the seal, as already explained, the inrushing air carries with it the quantity of the electrolyte remaining in the tube 11. However, the presence of the transverse extension 12 of the tube 11, carries this liquid over and into the down tube 10, so that it flows back into the cell as shown by the arrows in cell $A^3$. Moreover, the air dome 9 being of relatively large capacity, permits the air to pass through it and to the tank through the tube 7, without entraining any of the liquid and carrying it over into the water supply.

The action just described continues and the water from the tank flows into the cell, until its level rises, first covering the end of the longer branch $13^b$, which retards the action somewhat, and finally covers the end of the shorter branch $13^a$ whereupon the action ceases and the liquid level, as in cell $A^1$, is restored until the action is again started by the lowering of the level in the cells.

As has already been pointed out, the water evaporation in each cell varies, and hence the necessity of separate filling devices for each. This also explains the reason why it is impractical to control the feed to all cells by the action in a single cell, since manifestly the filling of one cell to its proper level may mean the overflow in the other cells with an attendant loss of electrolyte.

Having disclosed a preferred embodiment of my invention, it will be helpful to point out its novel and useful features. The principal function performed is the automatic venting of the supply tank, without carrying over into the tank a quantity of electrolyte which must necessarily occur where a single vent tube or even an inverted U-tube is used, as can be readily demonstrated by experiment. It is manifest that any quantity of electrolyte drawn into the supply tank results in a gradual depletion of the electrolyte in the cell and an increasingly strong acid solution in the supply tank. This defect is entirely overcome by my arrangement of air dome 9 and transverse extension 12, which carries the liquid beyond the point where it could be carried by the air suction into the tube 7, leading to the tank.

A further accomplishment is the certain and automatic starting of the action, which is not ordinarily possible where tubes of small diameter are used. In other words, without the inverted U-tube 13, at the lower end of the tube 11, the liquid will "hang" in the tubes even though uncovered, and action can be started only by violently agitating or shaking the entire apparatus. Thus it is to provide the small U-tube 13 so-called which acts as a primer or starter to insure positive and automatic operation, particularly where the battery is stationary when in use. Under some conditions of use, and especially in the case of storage batteries for motor vehicles, the vibration and jolting of the vehicle in motion, would be sufficient to start the action without the "priming" U-tube, and therefore under certain circumstances could be dispensed with, and the tube 11 continued as a single passage into the cell to the level at which the refilling operation is to take place.

For the foregoing and other obvious reasons, I do not wish to be limited in the structure or application of the device embodying my invention, except as set forth in the appended claims.

I claim as my invention:

1. In a filling device for the purpose described, the combination with a receptacle to be filled, of a supply tank having a discharge passage leading to said receptacle and below the level of the liquid therein, an inverted U-passage communicating with said tank and comprising a plurality of down branches extending into said receptacle and connected at their upper ends at a point above the water level in said tank, one of said branches terminaing at the predetermined high level in said receptacle and the other below said level.

2. In a filling device for the purpose described, the combination with a liquid receptacle, of a supply tank positioned above the receptacle and having a discharge passage extending into said receptacle below a predetermined level of the liquid therein, an inverted U-tube communicating with said tank and comprising a branch uniting at a point above the water level in said tank, and depending into said receptacle, and terminating at different predetermined levels herein, and means for promoting the passage of air upwardly through one of said tubes when its end is uncovered by the liquid in the receptacle.

3. In a filling device for the purpose described, the combination with a liquid receptacle, of a supply tank having a discharge passage leading into said receptacle and below a predetermined level of the liquid therein, an inverted U-tube communicating with said tank and comprising an air dome located above the water level in said tank, a pair of tubes depending from said air dome into said receptacle, one of said tubes being shorter than the other and terminating at the predetermining high level, of the liquid in said receptacle.

4. In a filling device for the purpose described, the combination with a liquid receptacle of a supply tank having a discharge passage leading into said receptacle and below a predetermined level of the liquid therein, an inverted U-tube communicating with said tank and comprising a pair of down branches extending into said receptacle and united at their upper ends by a relatively large air chamber located above the water level in said tank, one of said branches terminating at the predetermined high level in said receptacle, and the other below said level, and means for conducting liquid from the upper end of one of said branches into the entrance to the other branch within said air chamber.

5. In a filling device for the purpose described, the combination with a liquid receptacle of a supply tank having a discharge passage leading into said receptacle and below a predetermined level of the liquid therein, an inverted U-passage communicating with said tank and comprising a pair of down branches united at a point above the water level in said tank by means of a relatively large transverse chamber, said branches extending into the receptacle, with one terminating at the predetermined high level of the liquid therein and the other terminating below said high level, means for conducting the liquid through said chamber from one of said branches to the other, and means for promoting the passage of air upwardly through the shorter of said branches when its end is uncovered by the liquid in the receptacle.

6. In a filling device for the purpose described, the combination with a liquid receptacle, of a supply tank having a discharge passage leading into said receptacle and below a predetermined level of the liquid therein, an inverted U-tube communicating with said tank and comprising a pair of down branches extending into said receptacle, an air dome located in said U-tube and communicating with the upper ends of said branches above the water level in said tank, one of said branches being shorter than the other and provided at its lower end with an inverted U-tube having branches of unequal length terminating at the predetermined high level of the liquid in said receptacle.

7. In a filling device for the purpose described, the combination with a liquid receptacle, of a supply tank having a discharge passage leading into said receptacle below the level of the liquid therein, an inverted U-tube communicating with said tank and comprising a pair of down branches uniting at their upper ends above the water level in said tank, and extending into said receptacle, one of said branches being shorter than the other and having its lower end portion divided to form an inverted U-tube, having branches of unequal length terminating at the approximate high level of the liquid in said receptacle.

8. In a filling device for the purpose described, the combination with a liquid receptacle, of a supply tank located above said receptacle and having a discharge pipe leading into said receptacle and terminating below a predetermined level of the liquid therein, an inverted U-passage communicating with said tank and comprising an air dome located above the water level in said tank, a pair of tubes depending from said air dome into said receptacle, one of said tubes being shorter than the other and provided at its upper end with an extension extending transversely of said air dome and opening downwardly into the upper end of the other tube, and an inverted U-tube forming the lower portion of said shorter tube and having branches of unequal length terminating at the approximate high level of the liquid in said receptacle.

Signed at Chicago, Ill. this 11th day of February 1926.

DREW HEAD.